(12) United States Patent
Barton (10) Patent No.: US 10,436,348 B2
(45) Date of Patent: Oct. 8, 2019

(54) USAGE MONITORING SYSTEM AND METHOD

(71) Applicant: CHARGEPOINT TECHNOLOGY LIMITED, Liverpool (GB)

(72) Inventor: Richard Athol Barton, Salford (GB)

(73) Assignee: CHARGEPOINT TECHNOLOGY LIMITED (GB)

( * ) Notice: Subject to any disclaimer, the term of this patent is extended or adjusted under 35 U.S.C. 154(b) by 281 days.

(21) Appl. No.: 15/501,014

(22) PCT Filed: Jul. 30, 2015

(86) PCT No.: PCT/GB2015/052202
§ 371 (c)(1),
(2) Date: Feb. 1, 2017

(87) PCT Pub. No.: WO2016/016649
PCT Pub. Date: Feb. 4, 2016

(65) Prior Publication Data
US 2017/0227140 A1      Aug. 10, 2017

(30) Foreign Application Priority Data
Aug. 1, 2014   (GB) .................................. 1413707.9

(51) Int. Cl.
G06F 11/30   (2006.01)
F16K 37/00   (2006.01)
G05B 19/042  (2006.01)
F16K 31/60   (2006.01)

(52) U.S. Cl.
CPC ........ *F16K 37/0041* (2013.01); *F16K 31/602* (2013.01); *F16K 31/607* (2013.01); *F16K 37/00* (2013.01); *G05B 19/0425* (2013.01); *G05B 2219/33326* (2013.01)

(58) Field of Classification Search
CPC .................................................. F16K 37/0041
See application file for complete search history.

(56) References Cited

U.S. PATENT DOCUMENTS 8,560,096 B1   10/2013  Chapman et al.
2006/0032536 A1*  2/2006  Galloway ........... F16K 37/0091
                                                          137/554

FOREIGN PATENT DOCUMENTS

WO    WO 2012101640 A1    8/2012

OTHER PUBLICATIONS

PCT International Search Report dated Feb. 16, 2017; filed in International Application No. PCT/GB2015/052202; 7 pgs.

* cited by examiner

*Primary Examiner* — Phuong Huynh
(74) *Attorney, Agent, or Firm* — Vedder Price P.C.

(57) ABSTRACT

An apparatus for monitoring the usage of at least one maintainable part or component of a transfer valve or coupling comprises: data storage means for storing data representative of at least one attribute of the maintainable part or component of the valve or coupling; monitoring means for monitoring usage of the valve or coupling; and processing means for comparing the monitored usage of the valve or coupling against the at least one attribute of the maintainable part or component of the valve.

30 Claims, 5 Drawing Sheets

USAGE MONITORING SYSTEM AND METHOD

This invention relates to a usage monitoring system and method. In particular, this invention relates to a system and method for monitoring usage of valves, in particular, but not exclusively, to valves for controlling, charging, discharging and/or regulating the flow of powders, liquids, slurries, tablets and/or fluids.

Valves, such as split butterfly valves, are available in many designs and used widely for processes where product containment is required to prevent product exposure to the environment and to personnel working in close proximity to the product. Split butterfly valve designs allow the valve to be split open into two units, commonly known as active and passive units. The valve design is such that when split, the two units keep the contents on either side sealed and contained.

In the manufacture of pharmaceuticals, chemicals, biological material and food, effective containment is essential for the safe and hygienic handling of such compounds and materials. At each stage of the manufacturing process, handling must be controlled and managed to provide optimum protection for the operator and for maintaining the integrity of the product.

The material being handled is often hazardous to health, owing to the increasing potency of many new pharmaceutical ingredients. Pharmaceutical and bio-manufacturing products are often manufactured under strict controls against product contamination. This is because the products are often for human consumption and the industries are heavily regulated by bodies like the FDA (Food and Drug Administration) in the United States and the MHRA (Medicines and Healthcare products Regulatory Agency) in the United Kingdom. Furthermore, the pharmaceutical products, such as active pharmaceutical ingredients and/or subsequently diluted powders, may in sufficient quantities be hazardous to the health of an operator. It is therefore necessary to avoid direct contact between an operator and the potentially hazardous material. Owing to such stringent requirements for there to be a good seal between the active and passive units of the split valve to prevent product exposure to the environment and to personnel working in close proximity of the product, manufacture of the components of the valve are under stringent conditions to ensure that the dimensions of the components are precisely manufactured to ensure stringent tolerances are met.

Ensuring that a good seal exists between the active and passive units of the split valve and between the valve components to prevent product exposure to both the environment and operators working in close proximity of the product is only possible if precisely manufactured valve components are used and properly maintained. A main cause of critical valve failure in a split valve assembly is due to excessive wear on the viscoelastic valve components and seats. Deterioration or degradation of these components may be due to a number of factors or parameters, including, in no particular order, the viscoelastic material chosen and its service life, fluctuating environmental and process conditions, physical attributes (i.e. coarseness, flow rate, temperature) of product passing through the valve, and operator care and attentiveness. Currently, it is difficult to monitor these factors in a small, compact device to help ensure that the valve is always operated in a safe manner and to significantly prevent the risk of critical failure, misuse or unplanned maintenance.

It is an object of the present invention to overcome or alleviate one or more of the problems associated with the operation of valves in the prior art.

According to the present invention there is provided an apparatus for monitoring the usage of at least one maintainable part or component of a transfer valve or coupling, comprising:

data storage means for storing data representative of at least one attribute of the maintainable part or component of the valve or coupling;

monitoring means for monitoring usage of the valve or coupling; and processing means for comparing the monitored usage of the valve or coupling against the at least one attribute of the maintainable part or component of the valve.

Preferably, the valve or coupling is a powder transfer valve.

Further preferably, the valve or coupling is selected from the group consisting of split butterfly valve, split sliding gate valve, split ball valve, twin valve, rapid transfer port and alpha beta port.

In use, the usage of the valve or coupling may comprise an opening and/or closing event, a locking and/or unlocking event or a docking and/or undocking event of the valve or coupling.

Preferably, the monitoring means for monitoring usage of the valve or coupling is selected from the group consisting of multi-axis accelerometer, rotational encoder and on/off sensor.

Further preferably, the monitoring means for monitoring usage of the valve or coupling senses the rotational position of a valve closure member relative to a valve housing.

In use, the at least one attribute of the maintainable part or component of the valve or coupling may comprise service life data.

Preferably, the monitoring means for monitoring usage of the valve or coupling is positioned on a valve actuator and/or the valve closure member.

Further preferably, the valve actuator comprises a manually-operable handle having an elongate shaft; one end of the shaft being dimensioned to form a knob; the other end of the shaft being dimensioned to form a central hub.

In use, the central hub may comprise a first face for connection to the valve or coupling and an opposite second face that is visible to the operator.

Preferably, the first face of the central hub comprises a socket dimensioned to connect with a square spigot on the valve or coupling.

Further preferably, the central hub defines a generally circular body into which a printed circuit board, battery and liquid crystal display is contained.

In use, the central hub may define a sealed, ingress protected enclosure.

Preferably, the data storage means and processing means are located on the printed circuit board.

Further preferably, the data storage means and processing means are implemented in a low power microcontroller.

In use, the processing means may receive a wake-up signal from user input buttons and/or from the monitoring means for monitoring usage of the valve or coupling and/or from one or more sensors embedded on or remote to the printed circuit board.

Preferably, the processing means receives a wake-up signal from input stimuli including rotation, pulse, shock, impact and/or vibration detected by the monitoring means for monitoring usage of the valve or coupling.

Further preferably, the processing means determines the position of the valve closure member in real-time or near real-time.

In use, the apparatus may further comprise display means for displaying at least one output signal to an operator via audio-visual, alphanumeric and/or haptic information.

Preferably, the at least one output signal is selected from the group consisting of monitored usage of the valve or coupling, data representative of at least one attribute of the maintainable part or component of the valve or coupling, date when one or more maintainable part or component of the valve or coupling was replaced or maintained, and one or more operating conditions in the vicinity of the valve or coupling.

Further preferably, the one or more operating conditions in the vicinity of the valve or coupling is selected from the group consisting of external/internal temperature, light intensity, humidity, atmospheric pressure, force, torque, stress and total usage time.

In use, the one or more operating conditions may be sensed using the one or more environmental sensors.

Preferably, the one or more environmental sensors is selected from the group consisting of photodiode, photoresistor, photodetector, resistance temperature detector, thermocouple, thermistor, piezoelectric, potentiometer, strain gauge, air flow sensor, anemometer, microphone, proximity sensor, motion sensor, Hall effect sensor.

Further preferably, the at least one maintainable part or component in a valve or coupling is selected from the group consisting of valve seat, valve closure member, valve body portions, seals, elastomeric O-rings, bushes, mechanical stop pins or any one of the mechanical components of the interlocking mechanism.

In use, the monitored usage of the valve or coupling, data representative of at least one attribute of the maintainable part or component of the valve or coupling, date when one or more maintainable part or component of the valve or coupling was replaced or maintained, and/or one or more operating conditions in the vicinity of the valve or coupling may be displayed for local or remote access.

Preferably, the monitored usage of the valve or coupling, data representative of at least one attribute of the maintainable part or component of the valve or coupling, date when one or more maintainable part or component of the valve or coupling was replaced or maintained, and/or one or more operating conditions in the vicinity of the valve or coupling are transmitted back to a remote server using a wired or wireless communications unit.

Further preferably, the data representative of at least one attribute of the maintainable part or component of the valve or coupling and/or date when one or more maintainable part or component of the valve or coupling was replaced or maintained is user configurable.

In use, the apparatus may further comprise a GPS location module which records the location of the valve or coupling.

Preferably, the low power microcontroller includes a unique product identifier.

Also according to the present invention there is provided a method of monitoring the usage of at least one maintainable part or component of a transfer valve or coupling, comprising the steps of:
  storing data representative of at least one attribute of the maintainable part or component of the valve or coupling;
  monitoring usage of the valve or coupling; and
  comparing the monitored usage of the valve or coupling against the at least one attribute of the maintainable part or component of the valve.

Further according to the present invention there is provided a self-powered unit positioned on the operating actuator of a valve or coupling for monitoring the usage of at least one maintainable part or component of a transfer valve or coupling, comprising:
  data storage means for storing data representative of at least one attribute of the maintainable part or component of the valve or coupling;
  monitoring means for monitoring usage of the valve or coupling;
  processing means for comparing the monitored usage of the valve or coupling against the at least one attribute of the maintainable part or component of the valve; and
  display means for displaying information on the at least one maintainable part or component of a powder transfer valve or coupling.

Also further according to the present invention there is provided a computer program product for monitoring the usage of at least one maintainable part or component of a transfer valve or coupling, comprising:
  computer program product means for storing data representative of at least one attribute of the maintainable part or component of the valve or coupling;
  computer program product means for monitoring usage of the valve or coupling; and
  computer program product means for comparing the monitored usage of the valve or coupling against the at least one attribute of the maintainable part or component of the valve.

It is believed that a usage monitoring system and method in accordance with the present invention at least addresses the problems outlined above. The advantages of the present invention are that a system and method is provided which ensures that the usage (i.e. each actuation) of the valve is accurately monitored, and this measured usage information is compared against stored attribute data, which could include service life data for various components of the valve. Displaying usage information to the operator advantageously reduces the occurrences of critical failure of valve components and seats, and thus reducing both planned downtime and unforeseen failure of valve components. Advantageously, a usage monitoring system and method which monitors the valve and provides guidance on when it needs maintaining will reduce the chance of the valve becoming unsafe or dangerous, or failing to operate correctly.

It will be obvious to those skilled in the art that variations of the present invention are possible and it is intended that the present invention may be used other than as specifically described herein.

Specific non-limiting embodiments of the invention will now be described by way of example only and with reference to the accompanying drawings, in which.

Figure 1:
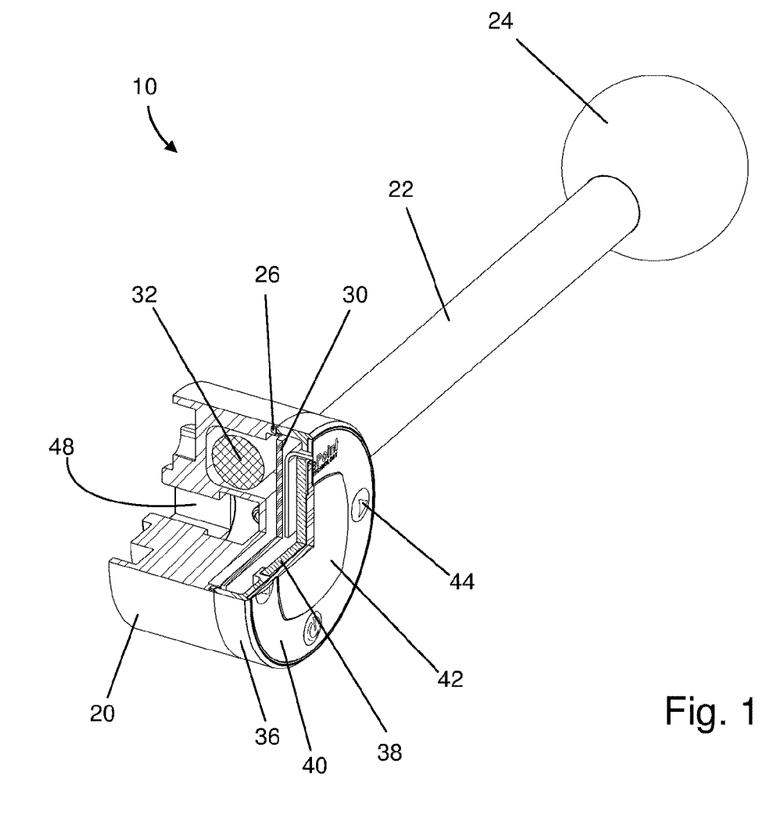
FIG. 1 is a cut-away side perspective view of the present invention embodied in a valve-actuating handle for manual operation of a valve in accordance with the present invention.
Figure 2:
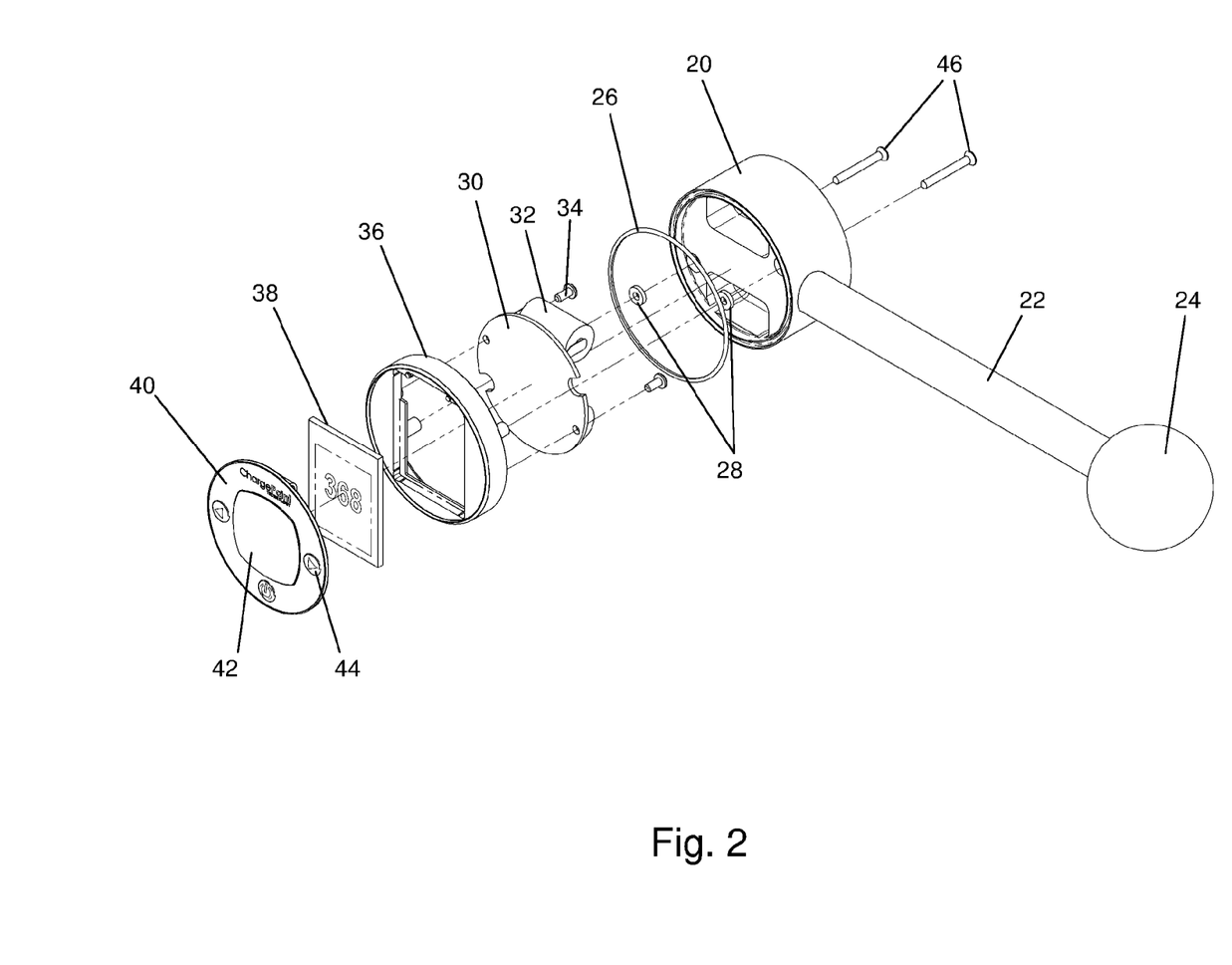
FIG. 2 illustrates an exploded view of the valve-actuating handle shown in FIG. 1.

Referring now to the drawings, a system for providing usage information to an operator of a valve or coupling is illustrated in FIGS. 1 and 2. FIGS. 1 and 2 show how the present invention can be embodied in a valve-actuating handle 10 for manual operation of split valve assemblies. The skilled person will appreciate that the invention is not restricted to the details of the foregoing embodiments. For example, the manually-operable handle 10 may be replaced with a different, powered actuator, such as pneumatic, electrical or other, and the usage of such monitored to provide guidance on maintenance or replacement.

Figure 3:
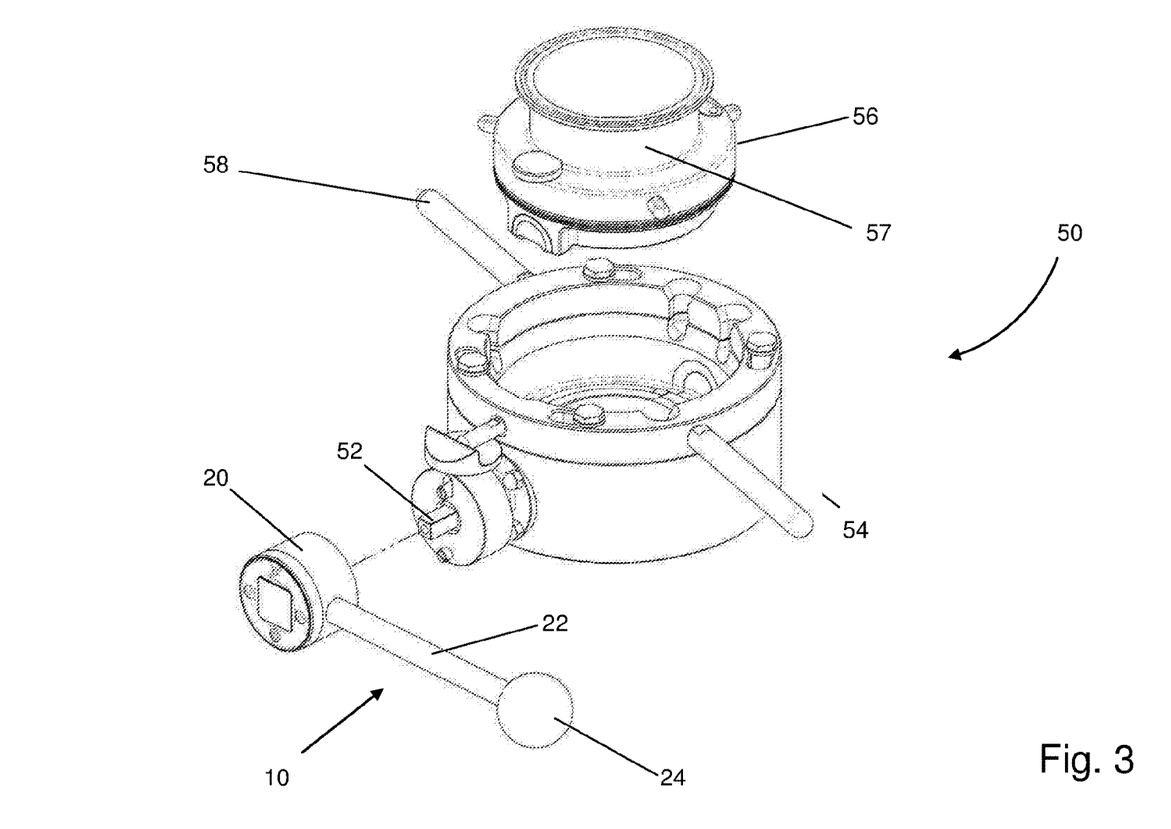
FIGS. 3 and 4 show how the valve-actuating handle of FIGS. 1 and 2 can be connected to a valve or coupling for manual operation.

As shown in FIG. 1, the valve-actuating handle 10 is formed having a solid handle shaft or arm 22; one end of which forms a knob 24. The other end of the handle shaft or arm 22 is secured to a hub 20 which is formed as a unitary, machined part. As best illustrated in FIG. 1, the rear face of the hub 20, i.e. the face that is placed in contact with the split valve assembly 50, defines a socket 48 which is dimensioned to connect with a square spigot 52 on the split valve assembly 50, as best illustrated in FIG. 3.

The front face of the hub 20, i.e. the face that is visible to the operator, is generally circular in shape.

As best shown in FIG. 2, the hub 20 includes a generally annular housing 36 into which a printed circuit board (PCB) 30 and power source or battery 32 is secured via fixing screws 34. A colour liquid crystal display (LCD) 38 is positioned inside the aperture in the housing 36, opposite the PCB 30. The colour LCD display 38 is then secured in a screen sub-assembly 40 which includes a protective, transparent screen or window 42 at its centre and operation or function buttons 44 positioned around the radius of the screen sub-assembly 40 for ease of access. The buttons 44 include a power on/off button, standby and/or one or more function buttons.

As the valve-actuating handle 10 is intended to be used in environmentally-challenging conditions, including containing, regulating and controlling hazardous powders, dust, granular and semi-solid ingredients, the housing 36 and screen sub-assembly 40 are secured together using assembly screws 46 and internal O-ring seals 28 which secure the housing 36 and screen sub-assembly 40 to the hub 20 against a circumferential seal 26. To provide usage information to an operator of a valve or coupling, the PCB 30 includes various hardware, software, sensors and components, as best illustrated schematically and described in detail in relation to FIG. 5.

Figure 4:
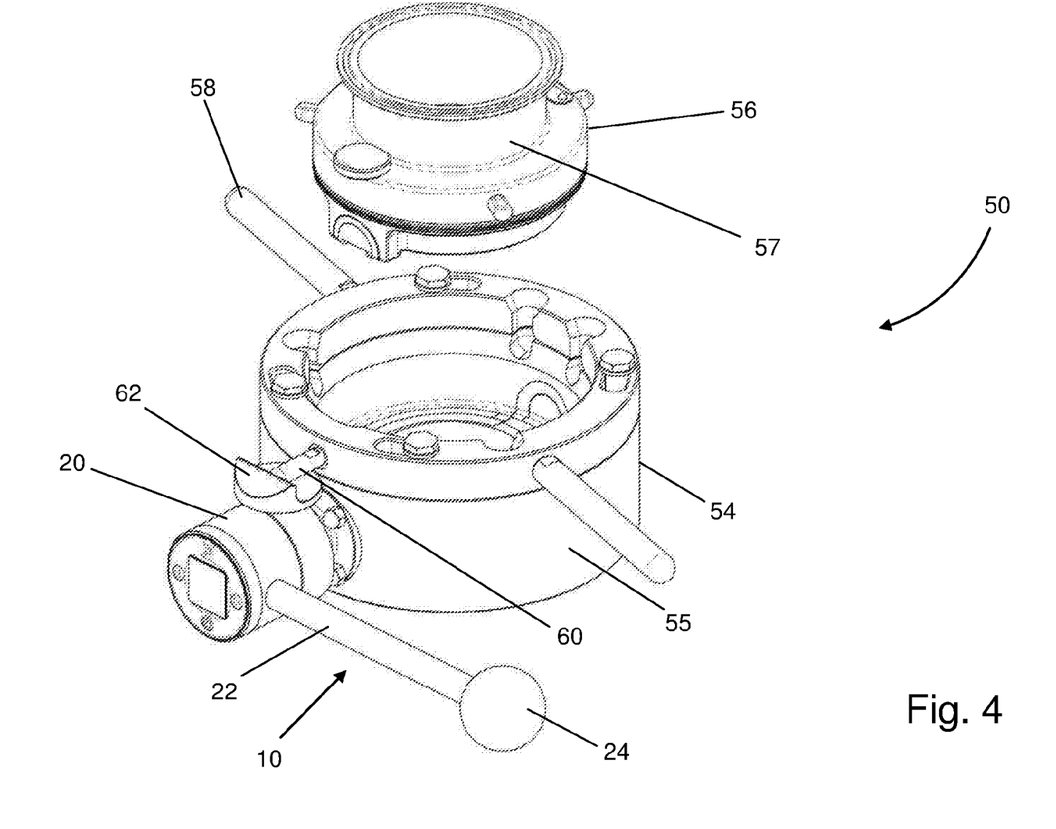

FIGS. 1 and 2 show how the present invention can be embodied in a valve-actuating handle 10 for manual operation of a valve or coupling, and particularly a split valve assembly 50 for containing, regulating and controlling hazardous powders, dust, granular and semi-solid ingredients. In use, the rear face of the hub 20, i.e. the face that is placed in contact with the split valve assembly 50, includes a socket 48 which is dimensioned to connect with the square spigot 52 on the split valve assembly 50, as shown in FIGS. 3 and 4. Operator rotation of the valve-actuating handle 10 controls respective pivotally-mounted valve closure members (not shown) inside the split valve assembly 50.

In an alternative embodiment, the hub 20 would be secured to the split valve assembly 50, with the valve-actuating handle 10 being rotatable within the body of the hub 20 to rotate socket 48. In this manner, the LCD display 38, and the operation and/or function buttons 44 positioned around the radius of the screen sub-assembly 40, are positioned in a fixed orientation for the user.

As shown in FIGS. 3 and 4, the split valve assembly 50 comprises two valve portions, an upper, passive valve portion 56 and a lower, active valve portion 54. The passive valve portion 56 defines a valve housing 57 which is generally annular in shape. The active valve portion 54 defines a valve housing 55 which is also generally annular in shape. The two valve portions 54, 56 are complementarily shaped such that one can sealingly engage and co-operate with the other to allow the movement of material therethrough. Although not shown in FIGS. 3 and 4, each valve potion includes valve closure members which are pivotally-mounted within the housings 55, 57. Each valve closure member is in the form of an annular disc, and each is provided with spindles by means of which each valve closure member is pivotally rotatable.

Although not shown in FIGS. 3 and 4, the spindle of the lower, active valve portion 54 is connected to, or is integrally formed with, spigot 52. Thus, rotation of the spindle is moved by rotation of the spigot 52. The spindle of the upper, passive valve portion 56 is connected to spigot 52. A mechanical safety interlock ensures the safe operation of the split valve assembly 50. When the two valve portions are correctly docked, the mechanical interlock pin 60 on the active valve portion 54 releases the profiled release pin 62 on the active valve portion 54 which allows the valve disc to be opened by rotation of the spigot 52.

The valve closure members are seated on annular valve seats (not shown) defined inside the valve housings 55, 57. The valve seats are resiliently deformable and are generally located in respective recesses for receipt of the seat which, in use, is adapted to engage against a solid portion of the valve housings 55, 57.

The valve closure members are adapted to be pivotable through 90° or beyond, thus when in its fully-open position the profile of the face of the valve closure members corresponds with the profile of the through bore of the valve housings 55, 57, and thereby provides minimal restrictions for the flow of fluid or other material.

FIGS. 3 and 4 also show that the two valve portions 54, 56 of the split valve assembly 50 are able to be locked and unlocked via rotation of a handle 58. This can only occur when the split valve assembly 50 is in a closed configuration.

The two valve portions 54, 56 of the split valve assembly 50 are mountable on a vessel (not shown) for containing material, conveyance means, such as a hose, for conveying material and/or other process equipment known to the art. The means for mounting the valve portions may comprise any means known to the art, such as for example a screw thread, interference fit, bayonet attachment etc. Alternatively, the valve portions 54, 56 may be integrally formed with a vessel or conveyance means.

Whilst the foregoing describes how the present invention can be embodied in a valve-actuating handle 10 for manual operation of a valve or coupling, and particularly a split butterfly valve assembly 50, the skilled person will appreciate that the invention can be implemented in any manner of transfer valve or coupling, such as, for example, split sliding gate valves, split ball valves, twin valves, rapid transfer ports and alpha beta ports.

Figure 5:
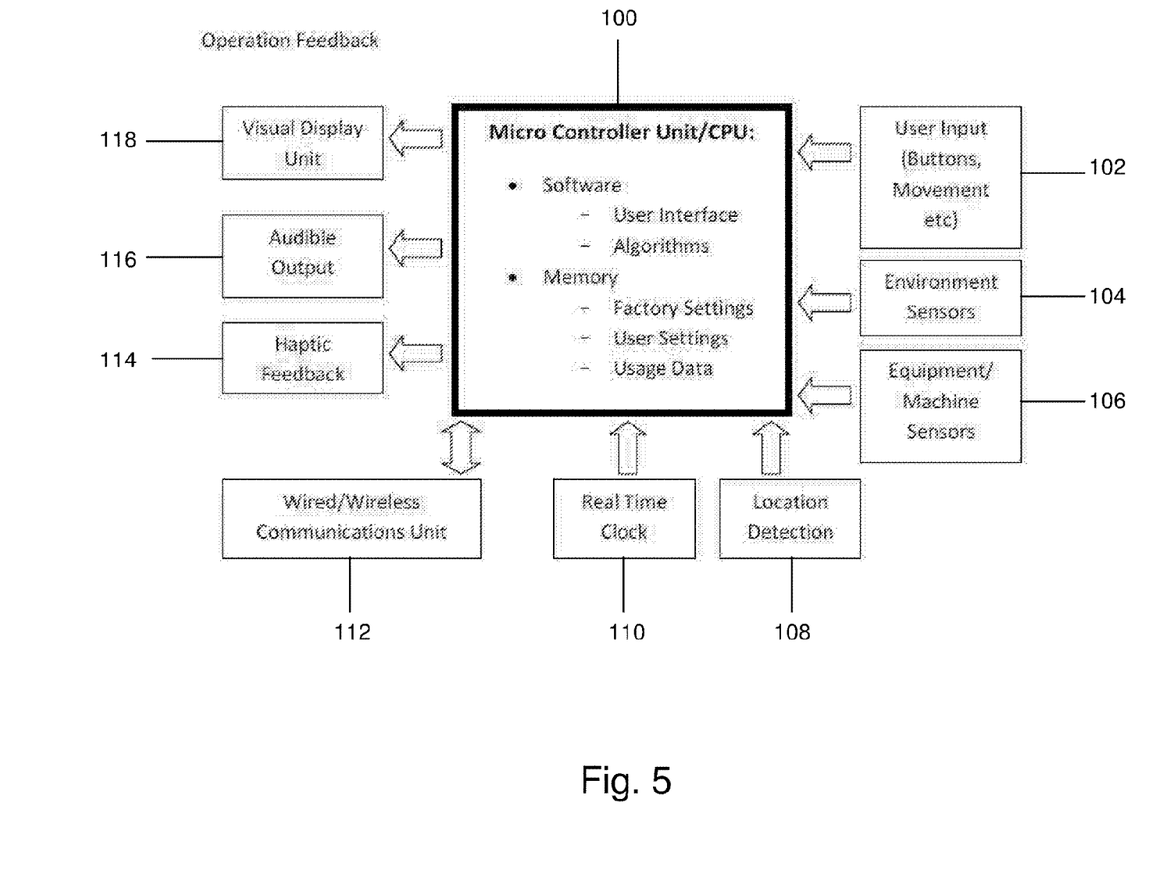
FIG. 5 is a high-level schematic diagram showing how the present invention is implemented in a microcontroller.

FIG. 5 is a schematic diagram showing how the system and method for providing usage information to an operator of a valve or coupling is implemented in a small, self-powered unit that includes a low power microcontroller 100. As shown in FIG. 5, the microcontroller 100 receives a number of inputs generally indicated in the right hand side of this figure.

The microcontroller 100 can be considered a self-contained system with a processor, memory and peripherals and can be used to monitor and provide usage information to the operator via a number of outputs generally indicated in the left hand side of this figure.

FIG. 5 is a schematic diagram and, in order to aid clarification, many other circuit elements are not shown. For example, although not shown in FIG. 5, the analogue signal received from one or more environmental sensors 104 embedded on the printer circuit board 30 is first converted to a digital form by any suitable type of analogue-to-digital convertor (ADC) available in the art. Equally, one or more of the digital outputs of the microprocessor 100 can be converted to analogue form using any form of digital-to-analogue convertor (DAC) available in the art. For example, such an analogue output signal could be used to energise an audible output 116.

In operation, a set of instructions or algorithm written in software in the microcontroller 100 are configured to program the microcontroller 100. The microcontroller 100, including the processor, memory and peripherals, are firstly placed in a low power, standby mode, awaiting a wake-up signal. The wake-up signal can be received from the user input buttons 102 and/or from one or more environmental sensors 104 embedded on the printer circuit board 30 and/or from one or more equipment sensors 106. In its most basic mode of operation, the microcontroller 100 can be effectively woken-up from standby mode by the operator pressing the on/off or standby button 102 located on the screen sub-assembly 40.

In addition or alternatively, the microcontroller 100 could effectively be woken-up from low power standby mode by the operator simply grasping the handle shaft 22 or knob 24, or by sensing operator proximity to the split valve assembly 50. In a preferred embodiment, one of the equipment sensors 106 located on the printed circuit board 30 is a positional sensor which senses the rotational position of the handle 22 relative to the split valve assembly 50. In use, the positional sensor is a three-axis accelerometer, and which is receptive to small input stimuli including rotation, pulse, shock, impact and/or vibration to firstly awaken the microcontroller 100. The skilled person will appreciate that the positional sensor could also be implemented using other multi-axis accelerometers, such as a six-axis accelerometer, or by the use of rotational optical encoders or on/off sensors and switches.

When the microcontroller 100 has been woken-up, it then senses the output of the three-axis accelerometer to determine the orientation and position of the rotation of the valve-actuating handle 10. Since the position of the valve-actuating handle 10 controls the position of the pivotally-mounted valve closure members inside the split valve assembly 50, the microcontroller 100 is able to determine the position of the pivotally-mounted valve closure members inside the split valve assembly 50 in real-time or near real-time.

The microcontroller 100, being able to determine the position of the pivotally-mounted valve closure members inside the split valve assembly 50 in real-time or near real-time, can detect and record the position of the valve closure members between fully-open (where the pivotally-mounted valve closure members create minimal restrictions for the flow of fluid or other material) and fully-closed (where the pivotally-mounted valve closure members are perpendicular to their respective valve seats).

In its most basic mode of operation, the microcontroller 100 can simply record an actuation of the split valve assembly 50 between a fully-open and fully-closed configuration, or vice versa, as one actuation event. In this embodiment, the usage data of the valve, which is stored in the microcontroller 100, will be incremented by one each time the valve is fully-opened or fully-closed. Alternatively, only each discrete closing of the valve closure members against the valve seats (when the viscoelastic valve components and seats come into contact at 90° with respect to the plane of the valve housing) is counted as an actuation event, and the angle that the valve closure member makes when partially open, i.e. below or above 90°, is not recorded.

The display 118 can be used to display the stored usage data of the valve to the operator and/or can include one or any combination of output signals to the visual display unit 118, such as an audible output or alarm 116 or some form of haptic feedback 114.

For the example, the display could be used to display the number of times the valve has been opened or closed, and also display additional information such as the service life data or when one or more valve components were last replaced etc.

Since each opening and closing of the valve is monitored and stored in local memory, this usage data of the valve can also be used to provide operator advice or guidance on when the seals and other performance critical parts should be replaced or maintained, or equally to limit the operation or actuation of the valve to ensure correct and/or use within safe operating limits. This usage data could also be examined after, for example, a fault condition has occurred to help forensically determine the cause of the failure.

The skilled person will appreciate that when operating the valve assembly 50 for controlling, charging, discharging and/or regulating the flow of liquids, slurries, tablets and/or hazardous fluids and potentially life-threatening pharmaceutical dusts and powders, it is imperative that a good seal is made between the valve closure member and the valve seat on each of the valve portions 54, 56. This is achieved, in practice, by operating the valve assembly in a safe and prescribed manner, and not by exceeding the service life data of performance-critical and/or maintainable parts or components of the valve.

As described above, the microcontroller 100 determines how many cycles the valve has been subject to since the valve seats (or other performance critical elements) have been inspected or replaced, and compares this to the stored service life data of the performance critical element.

Using the stored service life data of the performance critical element as a guide, the system and method provides information and guidance to the operator about when the performance critical elements should be replaced in a small, self-powered unit.

The present invention is also able to provide an even more reliable and robust system and method for monitoring usage of valves by additionally taking into account internal or external factors due to environmental (e.g. temperature, light, humidity, pressure) and process (e.g. powder type and coarseness, flow rates) conditions. Therefore, these one or more operating conditions in the vicinity of the valve can also be considered when determining valve usage information.

The system and method of the present invention therefore provides accurate usage data for a given valve or coupling by also taking into account one or more of the external factors or operating conditions described above. Deterioration or degradation of performance critical elements can be due to a number of factors or parameters, including, for example, changing environmental and process conditions, the actual physical attributes of product passing through the valve, and operator care and attentiveness. All of these factors will have an effect on the acceptable and safe period of use in service of the valve or coupling.

The microcontroller 100 records the total time that the valve has been in use, and the temperature that the valve has been exposed to. These may be received from one or more environmental sensors 104 embedded on the printer circuit board 30 or positioned remote to, but in the vicinity of, the valve. The interaction of the operator with the device, via the buttons 44 (or via any other input/output means) is also monitored and stored.

As well as the microcontroller 100 outputting at least one operator signal based on the comparison of the measured valve usage to the stored service life data, it is envisaged that this information can be stored in local memory for further local or remote analysis. This information can be accessed locally and/or transmitted back to a central server (not shown) using a communications unit 112 which may be a suitable wired or wireless communication protocol, including for example, Bluetooth, ZigBee, or over a cellular network.

Captured information can be transmitted from the microcontroller 100 to a central or dedicated web server or web-enabled device. Whilst data transmission can occur via a wired network, in a preferred embodiment, data transmission is over a wireless network which has advantages in terms of lower cost and quicker installation. The data is then available to a user online via a secure web-based interface. In this way, one or more appropriately authorised users can access the captured information obtained from the split valve assembly 50, and add also custom functionality without the intervention of the manufacturer.

The skilled person can also envisage that the present invention can be provided in a number of self-contained units monitoring a plurality of valves or couplings situated throughout a production line or facility. Each communications unit 112 can then be configured as a node of a wireless mesh network system which provides a very robust network, as each node only needs only transmit as far as the next node. Nodes act as routers to transmit data from nearby nodes to peers that are too far away to reach in a single hop, resulting in a network that can cover larger distances.

It is desirable that the wireless network has low power consumption, enabling several years of operation between battery changes.

As an alternative to the wireless network described hereinbefore, transmission of the data may occur over a WiFi network.

It is also envisaged that the microcontroller 100 could also include or has embedded therein a GPS location module 108 which records the actual location of the valve assembly 50, along with other environmental sensors which record conditions such as external/internal temperature, light intensity, humidity, atmospheric pressure, force measurement and operation time 110. These parameters can be stored in local memory and transmitted back to a central server (not shown) using the communications unit 112.

Also by measuring the environmental condition of the valve assembly 50, for example, if it was subject to excessive vibration or impact, pressure from the process, solvents, excessive forces from surrounding equipment etc., then such information can also be used, with the usage information to predict and prevent critical failure or unplanned maintenance.

The device is battery-powered and sealed to the environment (i.e. ingress protected) and safe for used in hazardous and/or potentially explosive environments (e.g. ATEX rated). The microcontroller 100 utilises low power components so that the system is designed to provide a long battery life.

Various alterations and modifications may be made to the present invention without departing from the scope of the invention. For example, although particular embodiments refer to implementing the present invention on a split valve assembly, this is in no way intended to be limiting as, in use, the present invention could be implemented in any machine or equipment where usage information is desired. The invention is not restricted to the details of the foregoing embodiments. For example, the manually-operable handle may be replaced with a different actuator, such as pneumatic, electrical or other, then their state could also be sensed to provide guidance for maintenance or service.

The invention claimed is:

1. An apparatus for monitoring the usage of at least one maintainable part or component of a transfer valve or coupling, comprising:
    data storage means for storing data representative of at least one attribute of the maintainable part or component of the valve or coupling;
    monitoring means for monitoring usage of the valve or coupling positioned on a valve actuator and/or a valve closure member; and
    processing means for comparing the monitored usage of the valve or coupling against the at least one attribute of the maintainable part or component of the valve, wherein the processing means determines the position of the valve closure member in real-time or near real-time.

2. An apparatus as claimed in claim 1, wherein the valve or coupling is a powder transfer valve.

3. An apparatus as claimed in claim 1, wherein the valve or coupling is selected from the group consisting of split butterfly valve, split sliding gate valve, split ball valve, twin valve, rapid transfer port and alpha beta port.

4. An apparatus as claimed in claim 1, wherein the usage of the valve or coupling comprises an opening and/or closing event, a locking and/or unlocking event or a docking and/or undocking event of the valve or coupling.

5. An apparatus as claimed in claim 1, wherein the monitoring means for monitoring usage of the valve or coupling is selected from the group consisting of multi-axis accelerometer, rotational encoder and on/off sensor.

6. An apparatus as claimed in claim 1, wherein the monitoring means for monitoring usage of the valve or coupling senses the rotational position of a valve closure member relative to a valve housing.

7. An apparatus as claimed in claim 1, wherein the at least one attribute of the maintainable part or component of the valve or coupling comprises service life data.

8. An apparatus as claimed in claim 1, wherein the valve actuator comprises a manually-operable handle having an elongate shaft; one end of the shaft being dimensioned to form a knob; the other end of the shaft being dimensioned to form a central hub.

9. An apparatus as claimed in claim 8, wherein the central hub comprises a first face for connection to the valve or coupling and an opposite second face that is visible to the operator.

10. An apparatus as claimed in claim 9, wherein the first face of the central hub comprises a socket dimensioned to connect with a square spigot on the valve or coupling.

11. An apparatus as claimed in any of claim 8, wherein the central hub defines a generally circular body into which a printed circuit board, battery and liquid crystal display is contained.

12. An apparatus as claimed in any of claim 8, wherein the central hub defines a sealed, ingress protected enclosure.

13. An apparatus as claimed in claim 1, wherein the data storage means and processing means are located on the printed circuit board.

14. An apparatus as claimed in claim 13, wherein the data storage means and processing means are implemented in a low power microcontroller.

15. An apparatus as claimed in claim 1, wherein the processing means receives a wake-up signal from user input buttons and/or from the monitoring means for monitoring usage of the valve or coupling and/or from one or more sensors embedded on or remote to the printed circuit board.

16. An apparatus as claimed in claim 15, wherein the processing means receives a wake-up signal from input stimuli including rotation, pulse, shock, impact and/or vibration detected by the monitoring means for monitoring usage of the valve or coupling.

17. An apparatus as claimed in claim 1, further comprising display means for displaying at least one output signal to an operator via audio-visual, alphanumeric and/or haptic information.

18. An apparatus as claimed in claim 17, wherein the at least one output signal is selected from the group consisting of monitored usage of the valve or coupling, data representative of at least one attribute of the maintainable part or component of the valve or coupling, date when one or more maintainable part or component of the valve or coupling was replaced or maintained, and one or more operating conditions in the vicinity of the valve or coupling.

19. An apparatus as claimed in claim 18, wherein the one or more operating conditions in the vicinity of the valve or coupling is selected from the group consisting of external/internal temperature, light intensity, humidity, atmospheric pressure, force, torque, stress and total usage time.

20. An apparatus as claimed in claim 18, wherein the one or more operating conditions are sensed using the one or more environmental sensors.

21. An apparatus as claimed in claim 20, wherein the one or more environmental sensors is selected from the group consisting of photodiode, photoresistor, photodetector, resistance temperature detector, thermocouple, thermistor, piezoelectric, potentiometer, strain gauge, air flow sensor, anemometer, microphone, proximity sensor, motion sensor, Hall effect sensor.

22. An apparatus as claimed in claim 1, wherein the at least one maintainable part or component in a valve or coupling is selected from the group consisting of valve seat, valve closure member, valve body portions, seals, elastomeric O-rings, bushes, mechanical stop pins or any one of the mechanical components of the interlocking mechanism.

23. An apparatus as claimed in claim 1, wherein the monitored usage of the valve or coupling, data representative of at least one attribute of the maintainable part or component of the valve or coupling, date when one or more maintainable part or component of the valve or coupling was replaced or maintained, and/or one or more operating conditions in the vicinity of the valve or coupling is displayed for local or remote access.

24. An apparatus as claimed in claim 1, wherein the monitored usage of the valve or coupling, data representative of at least one attribute of the maintainable part or component of the valve or coupling, date when one or more maintainable part or component of the valve or coupling was replaced or maintained, and/or one or more operating conditions in the vicinity of the valve or coupling are transmitted back to a remote server using a wired or wireless communications unit.

25. An apparatus as claimed in claim 1, wherein the data representative of at least one attribute of the maintainable part or component of the valve or coupling and/or date when one or more maintainable part or component of the valve or coupling was replaced or maintained is user configurable.

26. An apparatus as claimed in claim 1, further comprising a GPS location module which records the location of the valve or coupling.

27. An apparatus as claimed in claim 1, wherein the low power microcontroller includes a unique product identifier.

28. A method of monitoring the usage of at least one maintainable part or component of a transfer valve or coupling, comprising the steps of:
   storing data representative of at least one attribute of the maintainable part or component of the valve or coupling;
   monitoring usage of the valve or coupling; and
   comparing the monitored usage of the valve or coupling against the at least one attribute of the maintainable part or component of the valve, by determining the position of the valve closure member in real-time or near real-time.

29. A self-powered unit positioned on the operating actuator of a valve or coupling for monitoring the usage of at least one maintainable part or component of a transfer valve or coupling, comprising:
   data storage means for storing data representative of at least one attribute of the maintainable part or component of the valve or coupling;
   monitoring means for monitoring usage of the valve or coupling;
   processing means for comparing the monitored usage of the valve or coupling against the at least one attribute of the maintainable part or component of the valve, wherein the processing means determines the position of the valve closure member in real-time or near real-time; and
   display means for displaying information on the at least one maintainable part or component of a powder transfer valve or coupling.

30. A computer-implemented program for monitoring the usage of at least one maintainable part or component of a transfer valve or coupling, comprising:
   storage means for storing data representative of at least one attribute of the maintainable part or component of the valve or coupling;
   monitoring means positioned on a valve actuator and/or a valve closure member for monitoring usage of the valve or coupling; and
   processing means for comparing the monitored usage of the valve or coupling against the at least one attribute of the maintainable part or component of the valve, wherein the processing means determines the position of the valve closure member in real-time or near real-time.

* * * * *